US010602601B2

(12) United States Patent
Tanaka et al.

(10) Patent No.: US 10,602,601 B2
(45) Date of Patent: Mar. 24, 2020

(54) CREEPING DISCHARGE ELEMENT DRIVE DEVICE AND CREEPING DISCHARGE ELEMENT DRIVE METHOD

(71) Applicant: KABUSHIKI KAISHA TOSHIBA, Minato-ku (JP)

(72) Inventors: Motofumi Tanaka, Yokohama (JP); Toshiki Osako, Kawasaki (JP); Hiroki Murayama, Yokohama (JP); Naoto Shinohara, Kawasaki (JP); Hiroyuki Yasui, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 16/271,126

(22) Filed: Feb. 8, 2019

(65) Prior Publication Data
US 2019/0174615 A1    Jun. 6, 2019

Related U.S. Application Data

(63) Continuation of application No. PCT/JP2017/028776, filed on Aug. 8, 2017.

(30) Foreign Application Priority Data

Aug. 10, 2016  (JP) ................................. 2016-157752

(51) Int. Cl.
  *H05B 41/16*     (2006.01)
  *H05H 1/24*      (2006.01)
  (Continued)

(52) U.S. Cl.
  CPC .......... *H05H 1/2406* (2013.01); *H02M 3/158* (2013.01); *H02M 7/06* (2013.01);
  (Continued)

(58) Field of Classification Search
  CPC .. H05B 41/28; H05B 41/295; H05B 41/2827; H05B 41/3925; H05B 33/0815;
  (Continued)

(56) References Cited

U.S. PATENT DOCUMENTS

2008/0157692 A1* 7/2008 Ichikawa ........... H05B 41/2887
                                                          315/219
2011/0194311 A1* 8/2011 Gaknoki ............... H02M 7/217
                                                          363/21.12

FOREIGN PATENT DOCUMENTS

JP        9-241007        9/1997
JP        2003-189638     7/2003
(Continued)

OTHER PUBLICATIONS

International Search Report dated Sep. 5, 2017 in PCT/JP2017/028776 filed on Aug. 8, 2017 (with English Translation).
Written Opinion dated Sep. 5, 2017 in PCT/JP2017/028776 filed on Aug. 8, 2017.

*Primary Examiner* — Minh D A
(74) *Attorney, Agent, or Firm* — Oblon, McClelland, Maier & Neustadt, L.L.P.

(57) ABSTRACT

A creeping discharge element drive device of an embodiment includes a switching element, a current detector, a zero-cross detection circuit, a storage, and a controller. The current detector detects alternating currents flowing through the switching element. The zero-cross point detection circuit detects a zero-cross point of the alternating currents. The storage stores a first threshold value of a resonant period. The controller drives the switching element to apply a test voltage to the creeping discharge element, determines a resonant period of the alternating currents from the detected zero-cross points of the alternating currents, and restricts or stops the driving of the switching element in response to the resonant period exceeding the first threshold value.

5 Claims, 17 Drawing Sheets

(51) Int. Cl.
   *H02M 7/48*      (2007.01)
   *H02M 3/158*     (2006.01)
   *H02M 7/06*      (2006.01)
   *H02M 7/5387*    (2007.01)

(52) U.S. Cl.
   CPC ......... *H02M 7/48* (2013.01); *H02M 7/53871* (2013.01); *H05H 2001/2412* (2013.01)

(58) Field of Classification Search
   CPC ............ H05B 41/3927; H05B 41/3921; H05B 41/2828; H05B 41/2325; H05B 41/04; H05B 41/2881; H05B 41/391; Y02B 20/202; Y02B 20/204; B23K 9/1031; B23K 9/1037; B60J 7/0573; F21K 5/023; H01F 30/02; H01F 38/10; H02H 7/0851; H01J 61/56
   See application file for complete search history.

(56) References Cited

FOREIGN PATENT DOCUMENTS

| | | |
|---|---|---|
| JP | 4029422 | 1/2008 |
| JP | 2015-136196 | 7/2015 |
| JP | 2016-189666 | 11/2016 |
| JP | 2016-189667 | 11/2016 |
| WO | WO 2016/158950 A1 | 10/2016 |
| WO | WO 2016/158951 A1 | 10/2016 |

\* cited by examiner

RESONANT PERIOD CORRESPONDING TO APPLIED VOLTAGE
(LOAD: DISCHARGE ELECTRODE)

CREEPING DISCHARGE ELEMENT DRIVE DEVICE AND CREEPING DISCHARGE ELEMENT DRIVE METHOD

CROSS-REFERENCE TO RELATED APPLICATIONS

This application is a continuation of prior International Application No. PCT/JP2017/028776, filed on Aug. 8, 2017 which is based upon and claims the benefit of priority from Japanese Patent Application No. 2016-157752 filed on Aug. 10, 2016; the entire contents of all of which are incorporated herein by reference.

FIELD

Embodiments described herein generally relate to a creeping discharge element drive device and a creeping discharge element drive method.

BACKGROUND

A recent wind power generator has a creeping discharge element on its windmill blade to increase a rotational force (lift) of the blade. The creeping discharge element is driven by power supply circuits including a switching circuit for converting a DC voltage into an AC voltage by a switching operation, a resonant reactor, and a high-voltage transformer for AC voltage boosting. The power supply circuit uses a resonance, which is generated by the resonant reactor and a capacitive component of the creeping discharge element, to apply a high-frequency high-voltage to the creeping discharge element, thus generating a streamer. This gives the lift to the blade.

The wind power generator is installed outdoors, so its installation environment greatly influences on the electrical performance of the creeping discharge element exposed on the blade. For example, the capacitive component of the creeping discharge element greatly varies according not only to the installation environment but also to a growth state of the streamer during the discharge.

The creeping discharge element is a discharge load having high nonlinearity, and its performance change causes the circuit for driving the creeping discharge element overloaded to generate heat. Insufficient cooling of the generated heat may lead to, for example, the overcurrent in the power supply circuit or a breakage of the creeping discharge element caused by overheating.

Thus, a conventional power supply circuit limits power, which is determined by voltage and current, and restricts a resonant period within a predetermined range.

The creeping discharge element of the wind power generator, which is installed outdoors, may get wet due to rainfall, at startup time or during the discharge, to increase its load capacitance. This leads to the resonant period out of the predetermined range to overload the circuit. Such environmental conditions should be considered.

A considerable measure detects an environmental state of the creeping discharge element with a rainfall detector and controls the circuit so as to stop a power supply to the creeping discharge element when detecting rainfall. This, however, increases a cost for additional installation of a device such as the rainfall detector.

SUMMARY

One or more aspect of the present invention are directed to a creeping discharge element drive device and a method which enable to avoid a circuit for driving a creeping discharge element from overloaded even if a load capacitance increases due to the deterioration of the creeping discharge element or an external environmental change, without an external environment detector.

A creeping discharge element drive device of an embodiment includes a switching element connecting to a creeping discharge element. The creeping discharge element drive device drives the switching element to apply a voltage to the creeping discharge element, thereby causing a streamer to be generated from the creeping discharge element. The creeping discharge element drive device includes a current detector, a zero-cross detection circuit, a storage, and a controller. The current detector detects an alternating current flowing through the switching element. The zero-cross detection circuit detects a zero-cross point of the alternating current detected by the current detector. The storage stores a first threshold value of a resonant period, the first threshold value being used for determining an abnormality of the creeping discharge element during test operation. The controller is programmed to: drive the switching element to apply a test voltage to the creeping discharge element during a test operation, the test voltage being lower than a voltage applied at a start of regular operation; determine a resonant period of the alternating current from a zero-cross point of the alternating current detected by the zero-cross detection circuit; and restrict or stop the driving of the switching element in response to the resonant period exceeding the first threshold value.

DETAILED DESCRIPTION

Embodiments will be hereinafter described in detail with reference to the drawings.

First Embodiment

Figure 1:
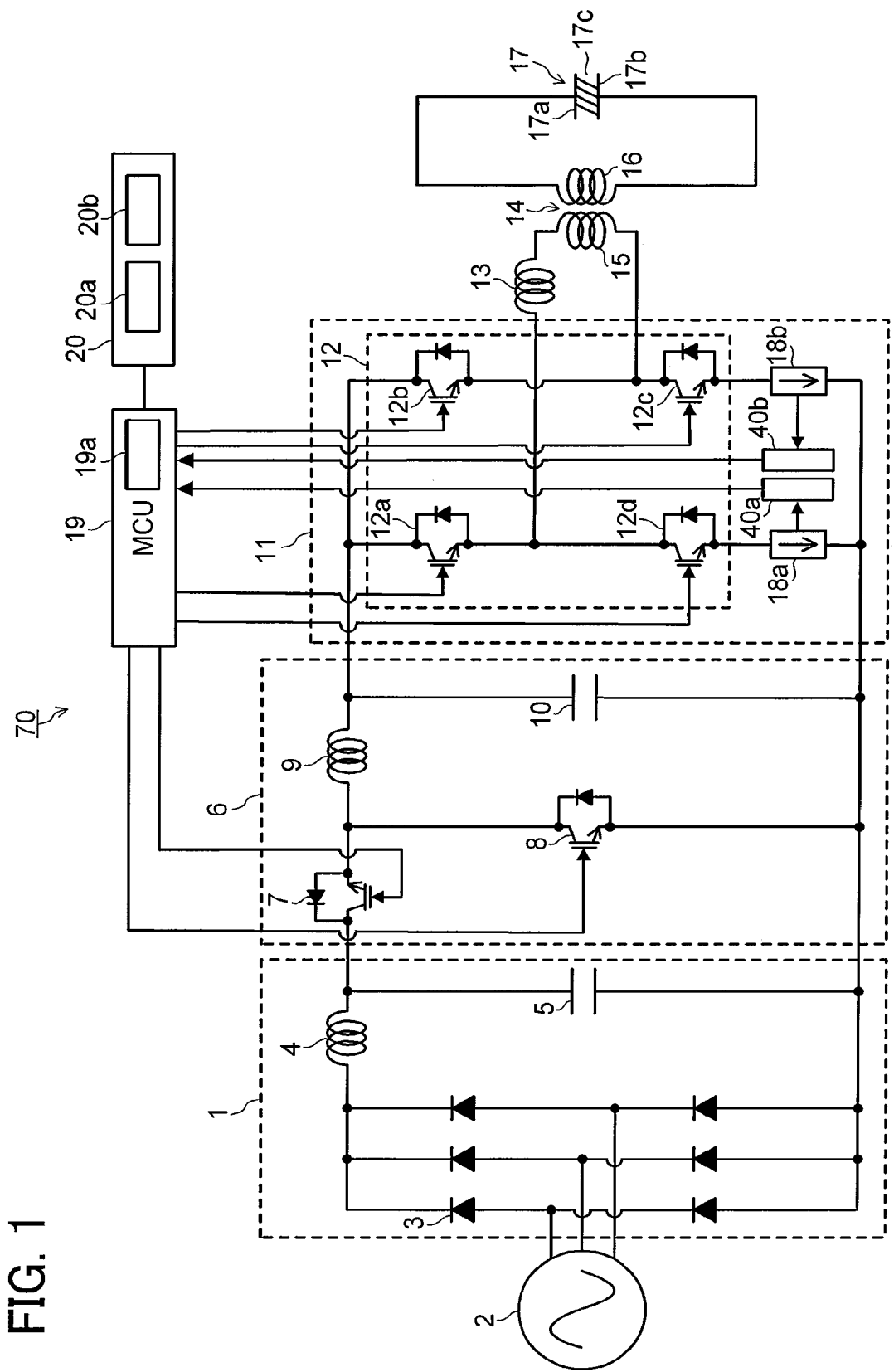
FIG. 1 is a diagram illustrating the electrical configuration (circuit configuration) of a creeping discharge element drive system of a first embodiment.

A creeping discharge element drive system of a first embodiment will be hereinafter described with reference to FIG. 1 to FIG. 13. FIG. 1 is a diagram illustrating the electrical configuration (circuit configuration) of the creeping discharge element drive system of the first embodiment.

As illustrated in FIG. 1, the creeping discharge element drive system 70 includes a power supply device 2 for creeping discharge, a rectifier circuit 1, a step-down circuit 6, a series resonant circuit 11, a resonant reactor 13, a high-frequency high-voltage transformer 14 including a primary winding 15 and a secondary winding 16, a creeping discharge element 17, a zero-cross point detection circuit 40a, 40b, a microcomputing unit 19 (hereinafter, referred to as "MCU 19"), and a memory 20.

The power supply device 2 outputs a three-phase AC 200 V (Vac). The rectifier circuit 1 includes three-phase rectifiers 3 connecting to the power supply device 2, a current-limiting reactor 4, and a smoothing capacitor 5, and converts the three-phase AC 200 V (Vac) into DC 280 V (Vdc).

The step-down circuit 6 connecting to the rectifier circuit 1 includes a series circuit of switching elements 7, 8 and a series circuit of a reactor 9 and a smoothing capacitor 10 which is in parallel connection with the switching element 8. The step-down circuit 6 steps down an output voltage (200 V (Vac)) of the rectifier circuit 1 to 20 V to 200 V.

The switching elements 7, 8 are each, for example, IGBT (Insulate Gate Bipolar Transistor) including a freewheel diode, but each may be a power device such as MOSFET (Field Effect Transistor). The switching element 8 may be a semiconductor device such as a rectifier that is not a self-arc-extinguishing element.

The series resonant circuit 11 connecting to the step-down circuit 6 includes a switching circuit 12, for example, an H-bridge circuit, including switching elements 12a, 12b, 12c, 12d. The primary winding 15 of the high-frequency high-voltage transformer 14 connects to the switching circuit 12 through the resonant reactor 13 and is disposed between output terminals of the switching circuit 12.

Specifically, the switching circuit 12 includes the positive-side switching elements 12a, 12b and the negative-side switching elements 12d, 12c. The switching circuit 12 receives an alternating voltage to switch the positive-side switching elements 12a, 12b and the negative-side switching elements 12d, 12c, thus generating an alternating voltage. The generated alternating voltage is applied to the primary winding 15 of the high-frequency high-voltage transformer 14.

The creeping discharge element 17 (discharge element) represented by the symbol of a capacitor connects to the secondary winding 16 of the high-frequency high-voltage transformer 14.

The creeping discharge element drive system 70 includes the switching circuit 12 (switching elements 12a, 12b, 12c, 12d) connecting to the creeping discharge element 17 through the high-frequency high-voltage transformer 14. The MCU 19 drives the switching circuit 12 (switching elements 12a, 12b, 12c, 12d) to apply a voltage to the creeping discharge element 17, thereby causing a streamer to be generated from the creeping discharge element 17.

Figure 8:
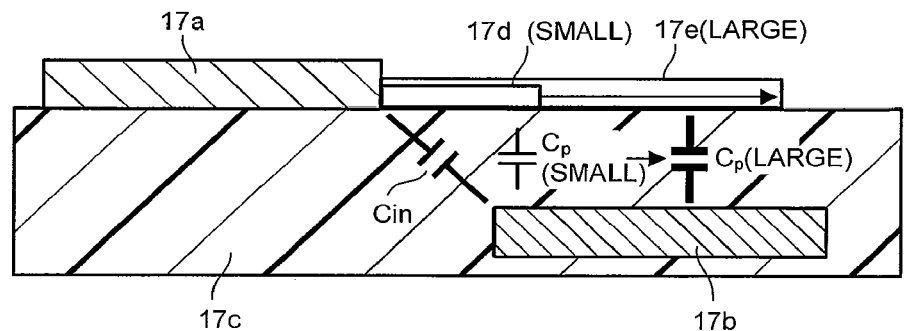
FIG. 8 is an image view illustrating a state where a capacitive component varies according to a degree of the growth of a streamer in a creeping discharge element during plasma discharge.

As illustrated in FIG. 8, in the creeping discharge element 17, a dielectric 17c is disposed between a discharge electrode 17a and an induction electrode 17b, and a capacitive component Cp of the creeping discharge element 17 varies according to a generation state of the streamer 17d generated from the discharge electrode 17a. The sign Cin in FIG. 8 represents a capacitance between the discharge electrode 17a and the induction electrode 17b.

Between the switching elements 12d, 12c, which are negative-side arms of the switching circuit 12, and a negative-side power supply line, current detecting elements 18a, 18b (current detectors) are inserted respectively. The current detecting elements 18a, 18b detect resonant currents flowing through the negative-side switching elements 12d, 12c.

The zero-cross point detection circuits 40a, 40b detect zero-cross points (falling edges) from the resonant currents (alternating currents) detected by the current detecting elements 18a, 18b connecting to these respectively, and upon detection, output interrupt signals (zero-cross signals) to the MCU 19. The configuration of the zero-cross point detection circuits 40a, 40b will be described in detail later in the description of FIG. 5.

The memory 20 stores a first threshold value 20a and a second threshold value 20b. The first threshold value 20a is a threshold value of a resonant period corresponding to a load capacitance in an assumed case where, during test operation, the creeping discharge element 17 whose discharge portion gets wet due to rainfall or the like is impressed with a test voltage lower than a voltage applied thereto at the start of regular operation. That is, the first threshold value 20a is a resonant period threshold value used for determining an abnormality of the creeping discharge element 17 during the test operation.

In other words, the first threshold value 20a is set larger than a value that a resonant period has during non-discharge when the creeping discharge element 17 is installed in the dry air. If the resonant period during the non-discharge when the test voltage (2 kVpp or the like) is applied is, for example, about 15 μsec, the first threshold value 20a is set larger than this value, for example, set to 17 μsec.

The second threshold value 20b is a threshold value of a resonant period corresponding to a load capacitance in an assumed case where, during discharge, the creeping discharge element 17 whose discharge portion gets wet due to rainfall or the like is impressed with a high voltage. That is, the second threshold value 20b is a resonant period threshold value used for determining an abnormality of the creeping discharge element 17 during the discharge (regular operation).

In other words, the second threshold value 20b is larger than the resonant period which is obtained when the creeping discharge element 17 is installed in the dry air and impressed with the voltage for the regular operation. If the resonant period when the voltage (15 to 18 kVpp or the like) for the regular operation is applied is, for example, 19 μsec, the second threshold value 20b is set larger than this value, for example, set to 20 μsec.

The MCU 19 outputs drive signals to the switching elements 7, 8 and the switching circuit 12 based on the zero-cross points detected by the zero-cross point detection circuits 40a, 40b to cause their switching operations, thereby applying a discharge voltage to the creeping discharge element 7 through the high-frequency high-voltage transformer 14.

As a result of the switching operation by the switching circuit 12, a resonance phenomenon between the creeping discharge element 17 and the resonant reactor 13 occurs. The MCU 19 controls the driving of the switching elements 12a to 12d based on the zero-cross points of the resonant currents detected by the current detecting elements 18a, 18b.

In more detail, the MCU 19 plays a role of a controller having a first to a third function. The first function, during the test operation, drives the switching elements 12a to 12d to apply the test voltage, lower than the voltage applied at the start of the regular operation, to the creeping discharge element 17 and determines the resonant periods of the alternating currents from the zero-cross points of the currents detected by the zero-cross point detection circuits 40a, 40b. The second function compares the determined resonant periods and the first threshold value 20a stored in the memory 20. The third function restricts or stops the driving of the switching elements 12a to 12d when the comparison result shows that the resonant periods exceed the first threshold value 20a.

During the test operation, the MCU 19 determines new resonant periods after the driving of the switching elements 12a to 12d is restricted or stopped, and if either of the new resonant periods is equal to or less than the first threshold value 20a, the MCU 19 drives the switching elements 12a to 12d to apply the voltage for the regular operation to the creeping discharge element 17.

After the test operation, the MCU 19 determines resonant periods while increasing the applied voltage for the regular operation, and if either of the resonant period exceeds the second threshold value 20b, the MCU 19 restricts or stops the driving of the switching elements 12a to 12d.

The MCU 19 includes an abnormality detection counter 19a. The abnormality detection counter 19a counts the number of times an abnormality occurs such as the resonant period exceeding the first threshold value 20a or the second threshold value 20b.

When the number of times of the abnormality detection counted by the abnormality detection counter 19a is less than a predetermined number of times (for example, 432 times), the MCU 19 stops the driving (oscillation operation) of the switching elements 12a to 12d, after a predetermined standby period passes from the stopping, the MCU 19 resumes the test operation (applies the test voltage).

When the number of times an abnormality such as the threshold value 20b being exceeded is detected is less than the predetermined number of times (for example, 432 times), this detection is the abnormality detection during the regular operation. In this case, the MCU 19 stops driving (oscillation operation of) the switching elements 12a to 12d, and after the predetermined standby time passes from the stopping, the MCU 19 drives the switching elements 12a to 12d to apply the high voltage instead of the test voltage.

Next, the operation of the creeping discharge element drive system 70 of the first embodiment will be described with reference to FIG. 2 to FIG. 7.

Figure 2:
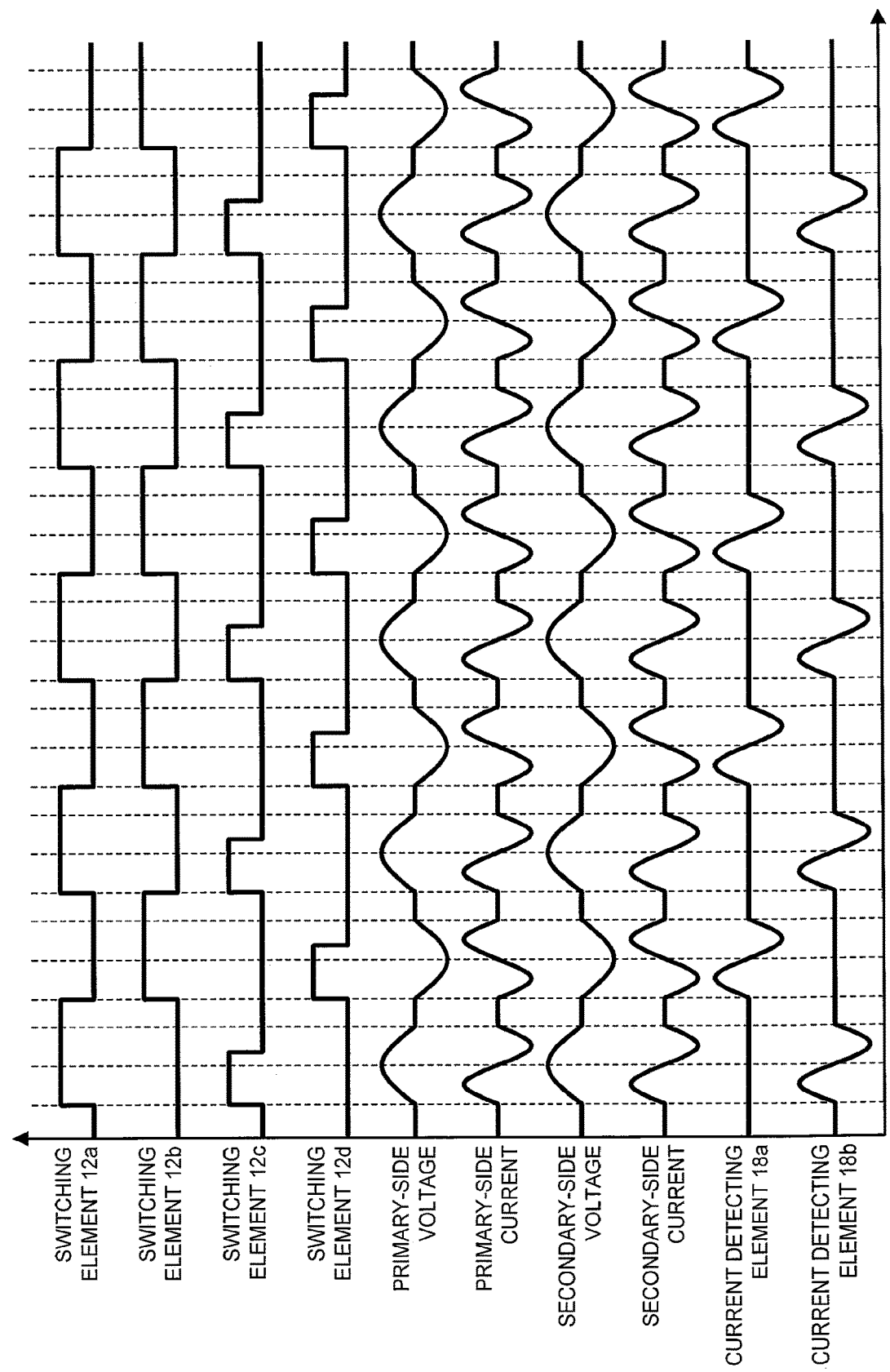
FIG. 2 is a timing chart of signals in the creeping discharge element drive system of the first embodiment.

As illustrated in FIG. 2, drive signals of the switching elements 12a, 12b are output so as to become on with a 50% duty of a switching period set to a creeping discharge period. The MCU 19 simultaneously turns on the switching elements 12a, 12c, and then turns off the switching element 12c at an instant when it detects, through the current detecting element 18b, the zero-cross point (falling edge detection point) of the resonant current flowing via the resonant reactor 13 and the high-frequency high-voltage transformer 14.

Further, the MCU 19 simultaneously turns on the switching elements 12b, 12d, and then turns off the switching element 12d at an instant when it detects the zero-cross point of the resonant current. The resonant period of the aforesaid resonant current is faster than the switching period of the switching elements 12a, 12b and accordingly faster than a control period of the MCU 19.

Here, the resonant period varies according to a stray capacitance of the creeping discharge element 17 itself and its capacitive component which depends on, for example, the growth state of the streamer generated during the discharge. The creeping discharge element 17, especially when installed outdoors, undergoes a variation in the stray capacitance due to an environmental factor such as, for example, rain, or the collision of dust or dirt with the creeping discharge element 17.

Figure 3:
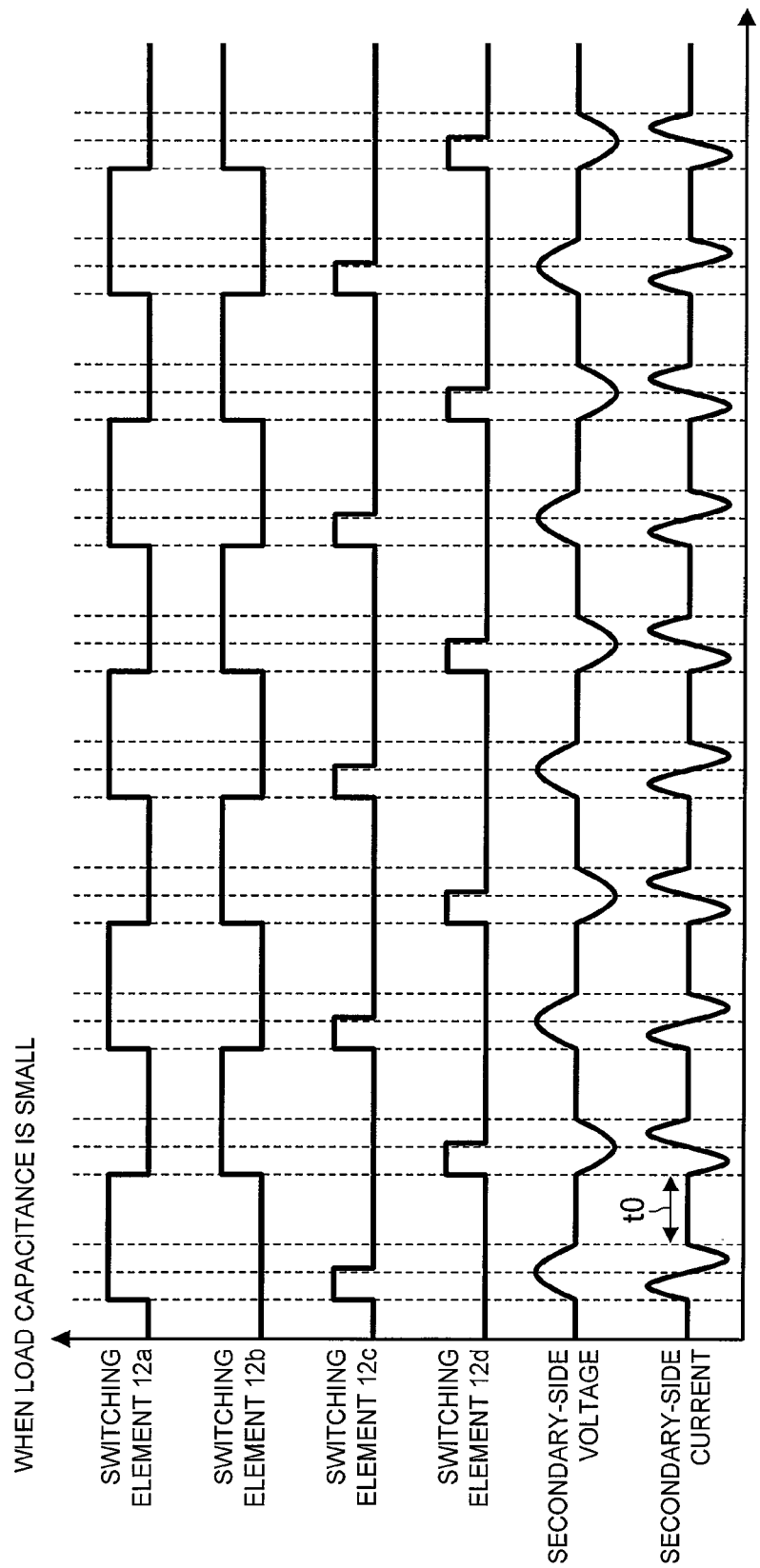
FIG. 3 is a timing chart of signals when a load capacitance is small.
Figure 4:
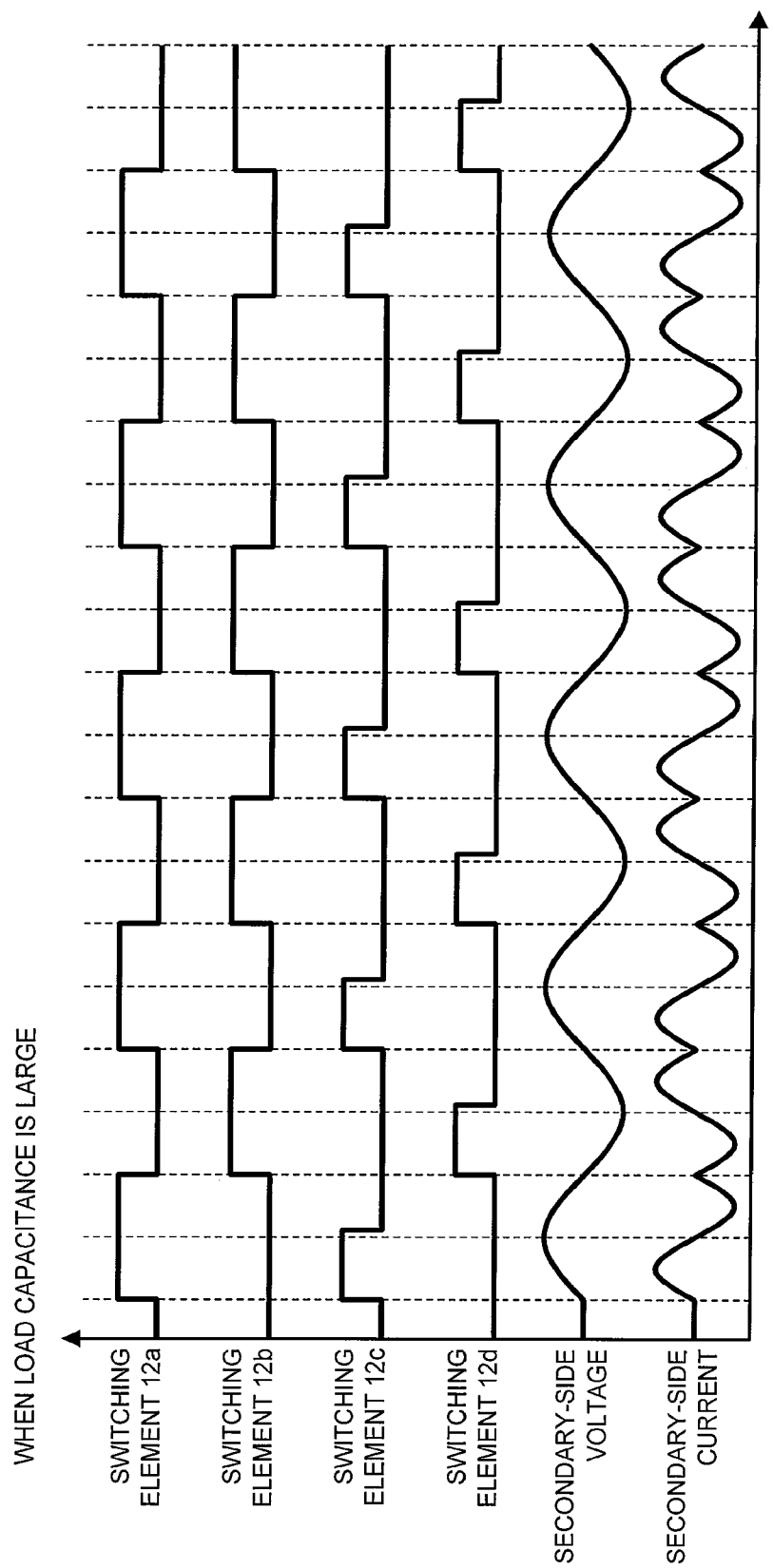
FIG. 4 is a timing chart of the signals when the load capacitance is large.

FIG. 3 and FIG. 4 illustrate waveforms of a voltage and a current on the secondary side of the high-frequency high-voltage transformer 14 when a load variation occurs, and they indicate that a resonant period and a zero-cross point of the current vary according to the size of the load. The creeping discharge element 17 which undergoes such a load variation is difficult to keep a normal resonant operation unless off-commands of the switching elements 12c, 12d are generated based on the detected zero-cross points of the resonant currents.

For example, as illustrated in FIG. 4, when the load capacitance is large, the resonant period is ½ times the switching period. Such large load capacitances, thus, cause a short circuit between the switching elements 12a-12d and between the switching elements 12b-12c of the switching circuit 12.

To cope with this, when the detection of the zero-cross point of the resonant current indicates that the resonant period approaches ½ times the switching period, the switching period is decreased and a current zero period t0 is generated as in FIG. 3 where the load capacitance is small. This enables the safe operation.

As described above, in the creeping discharge element drive system 70 which drives the creeping discharge element undergoing a large load variation, unless the series resonant circuit 11 is controlled based on the zero-cross point of the current, not only an operable range is limited but also the reliability of the circuit elements deteriorates.

In order to stably generate the drive signal according to the load environment, the zero-cross point of the resonant current is detected to generate an interrupt signal for turning off the switching element 12c (12d). This embodiment uses the zero-cross point detection circuit 40a (40b) illustrated in FIG. 5.

Figure 5:
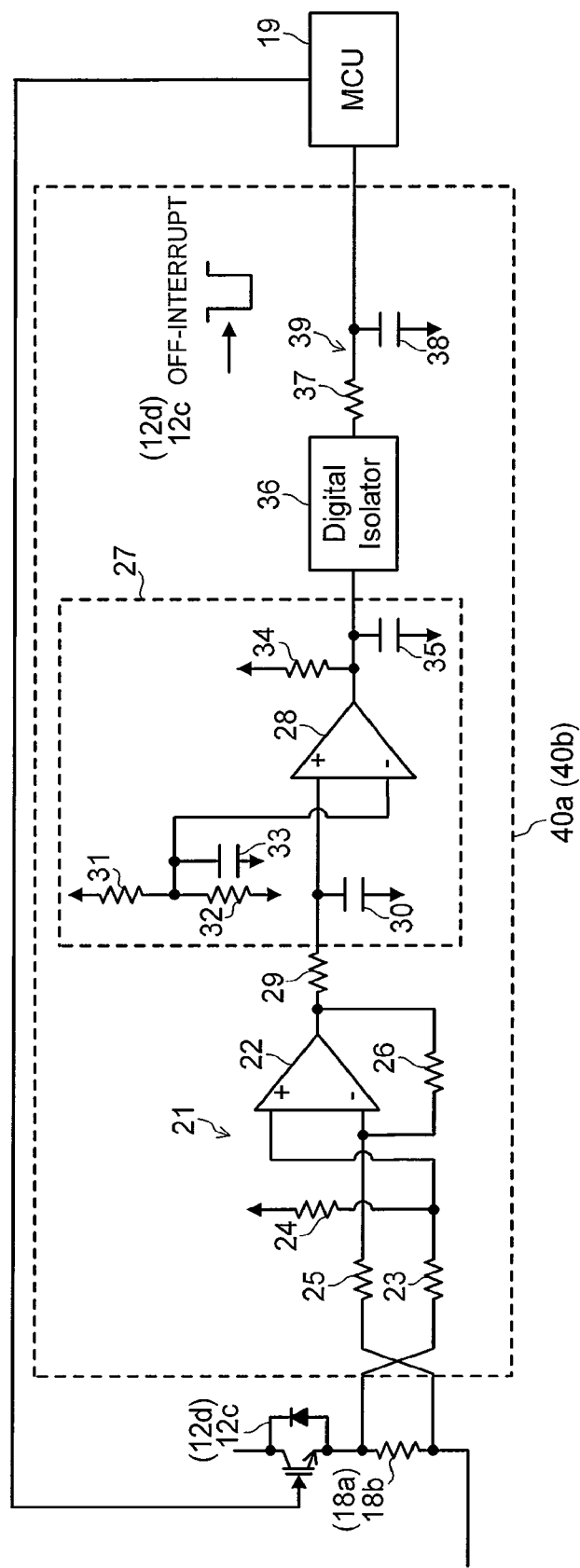
FIG. 5 is a diagram illustrating the electrical configuration of a zero-cross point detection circuit.

FIG. 5 illustrates the zero-cross point detection circuit 40a (40b) including a shunt resistor 18a (18b) as the current detecting element 18a (18b). Since the zero-cross point detection circuit 40a and 40b have the same circuit configuration, only the zero-cross point detection circuit 40a will be described, with the zero-cross point detection circuit 40b mentioned only in parentheses.

As illustrated in FIG. 5, the zero-cross point detection circuit 40a includes a differential amplifier circuit 21, a digital converter circuit 27, an isolator (digital isolator) 36, and a low-pass filter 39.

Since a current input to the zero-cross point detection circuit 40a through the shunt resistor 18a is a weak signal, the differential amplifier circuit 21 amplifies the signal input through the shunt resistor 18 to improve its SN ratio. The differential amplifier circuit 21 includes an operational amplifier 22.

A noninverting input terminal of the operational amplifier 22 connects to one end of the shunt resistor 18a (an emitter of the switching element 12c) through a resistance element 23 and is pulled up through a resistance element 24. An inverting input terminal of the operational amplifier 22 connects to the other end (ground) of the shunt resistor 18a through a resistance element 25 and also connects to an output terminal of the operational amplifier 22 through a resistance element 26.

The digital converter circuit 27 converts the signal amplified by the differential amplifier circuit 21 into a digital signal on the basis of the zero-cross point of the current. The digital converter circuit 27 includes a comparator 28. A noninverting input terminal of the comparator 28 connects to an output terminal of the differential amplifier circuit 21 through a resistance element 29 and also connects to the ground through a capacitor 30.

An inverting input terminal of the comparator 28 connects to a common node of a series circuit of resistance elements 31, 32 which divides a DC power supply voltage, and also connects to the ground through a capacitor 33. An output terminal of the comparator 28 is pulled up through a resistance element 34 and also connects to the ground through a capacitor 35.

The digital converter circuit 27 is given a hysteresis characteristic so as to be capable of outputting a high-level signal when a normal current is not flowing, and the digital converter circuit 27 changes a comparison signal of the comparator 28 until a current value becomes negative. This structure of the digital converter circuit 27 enables its output signal to change from high level to low level, or fall, at the zero-cross point of the resonant current.

The isolator (digital isolator) 36 isolates a main circuit and a control circuit in the transmission of the output signal of the digital converter circuit 27. Since the zero-cross signal input to the MCU 19 is, for example, a several 10 kHz to 100 kHz signal, the isolator 36 is the digital isolator capable of high-speed conversion.

The low-pass filter 39 is a circuit composed of a resistance element 37 and a capacitor 38, and inputs, to the MCU 19, the output signal of the digital converter circuit 27 which is input through the isolator (digital isolator) 36.

That is, the falling edges of the output signals of the zero-cross point detection circuits 40a, 40b serve as the interrupt signals (zero-cross signals) to the MCU 19.

The MCU 19 outputs the off-commands (drive signals) to the switching elements 12c, 12d of the switching circuit 12 in response to the falling edges of the interrupt signals (off-interrupts) input from the zero-cross point detection circuits 40a, 40b.

Figure 6:
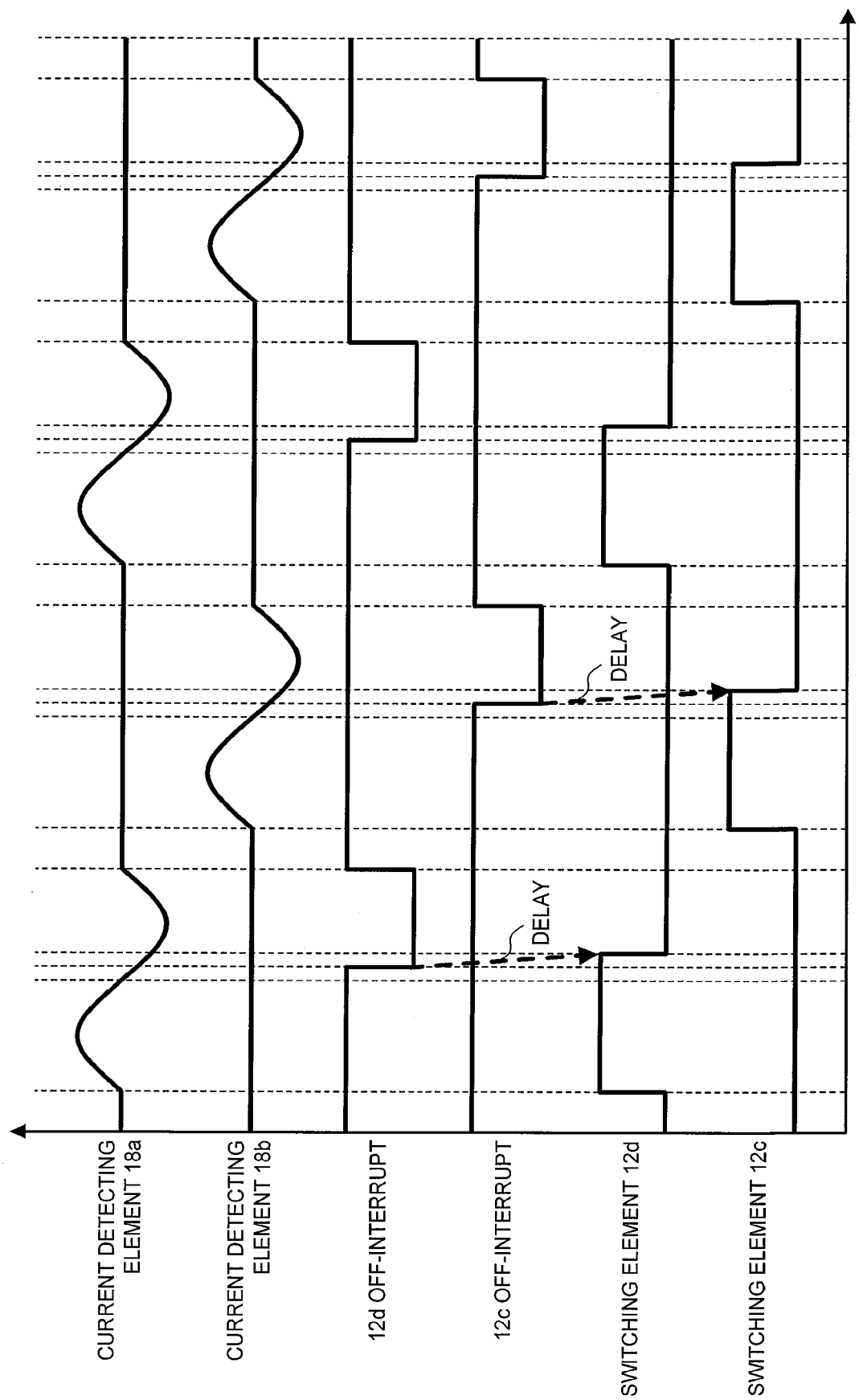
FIG. 6 is a timing chart illustrating delay operations of switching elements in response to off-interrupts.

In the switching circuit 12, when the off-commands (off-interrupts) are input, the switching elements 12c, 12d turn off after a slight delay (refer to FIG. 6). At this time, since they need to turn off during a negative period of the resonant current, gate loads of the switching elements 12c, 12d are set to a constant enabling them to turn off with the minimum load.

Figure 7:
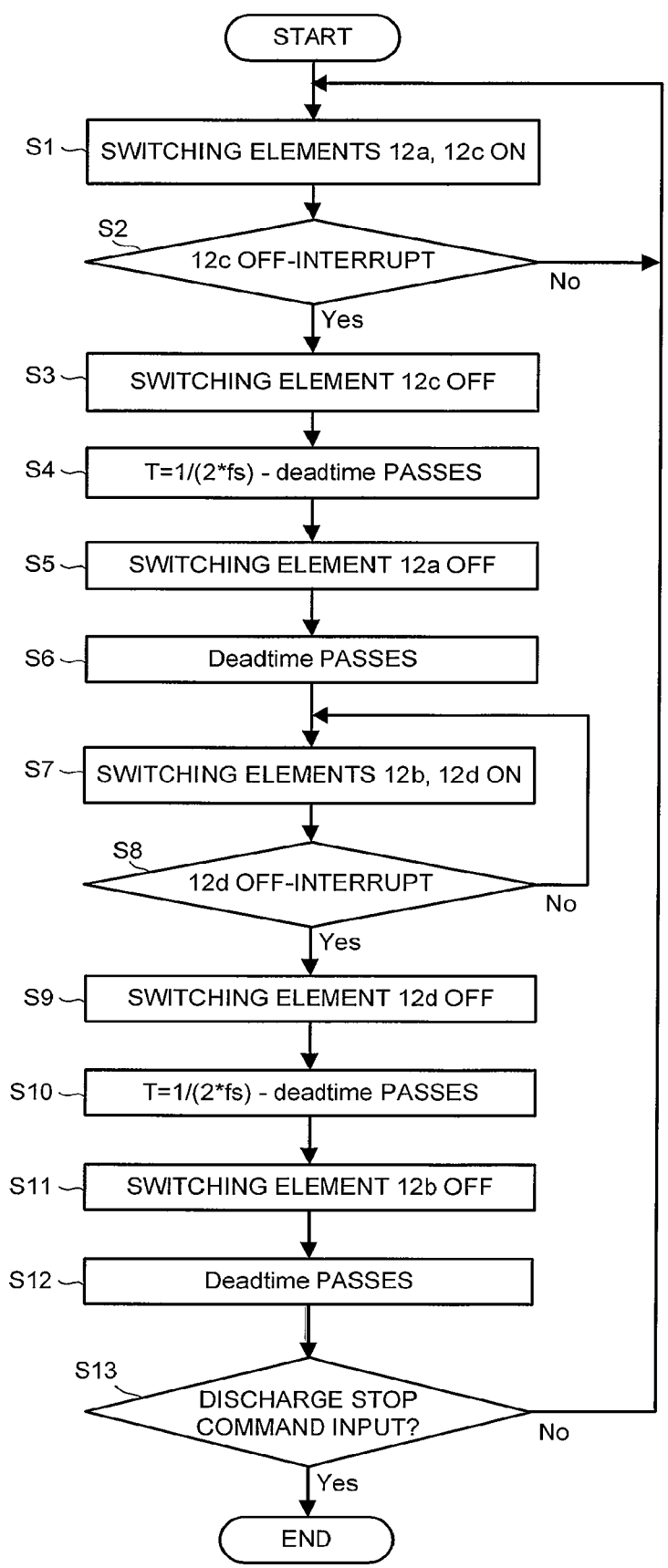
FIG. 7 is a flowchart illustrating a control operation by MCU.

Here, the operation of the MCU 19 for controlling the series resonant circuit 11 will be described with reference to the flowchart in FIG. 7. FIG. 7 is a flowchart illustrating the operation of the MCU 19 for controlling the series resonant circuit 11.

First, the MCU 19 simultaneously turns on the switching elements 12a, 12c (Step S1 in FIG. 7), and keeps the simultaneous on-state until the off interrupt of the switching element 12c is input (Step S2: No).

Then, when the off-interrupt of the switching element 12c is input (Step S2: Yes), the MCU 19 turns off the switching element 12c (Step S3). After turning on the switching element 12a, the MCU 19 keeps the on-state for a period equal to ½ of the switching period from which a deadtime set for short circuit prevention is subtracted (Steps S4, S5).

After the deadtime passes (Step S6), the MCU 19 simultaneously turns on the switching elements 12b, 12d (Step S7).

Thereafter, as is the case with the switching elements 12a, 12c, when the off-interrupt signal of the switching element 12d is input (Step S8: Yes), the MCU 19 turns off the switching element 12d (Step S9), and keeps the on-state of the switching element 12b for a period equal to ½ of the switching period from which the deadtime is subtracted (Steps S10, S11).

After the deadtime passes (Step S12), the MCU 19 checks whether or not a discharge stop command is input (Step S13).

When the checking turns out that the discharge stop command is not input (Step S13: No), the MCU 19 returns to the process at Step S1, and when the checking turns out that the discharge stop command is input (Step S13: Yes), ends the operation.

Next, a high-efficiency control operation using the detected resonant period will be described with reference to FIG. 8 to FIG. 11.

As illustrated in FIG. 8, the streamer 17d on the creeping discharge element 17 grows to a streamer 17e as the applied voltage increases, and the growing of the streamer increases the capacitive component Cp of the creeping discharge element 17.

Figure 9:
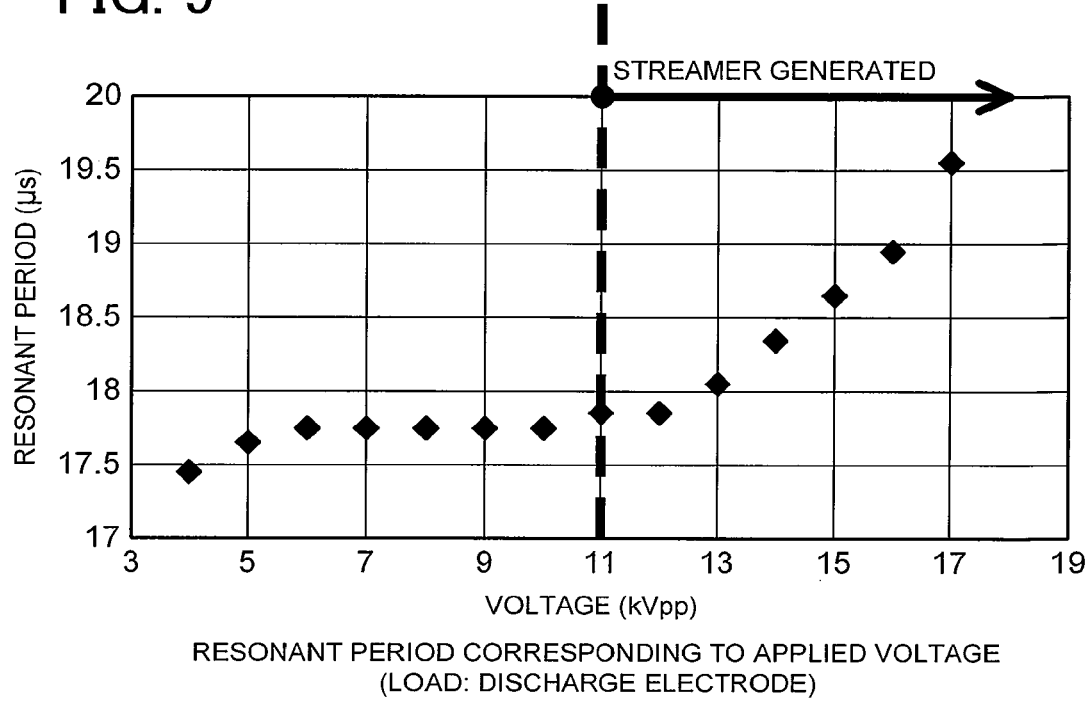
FIG. 9 is a graph representing a relation between an applied voltage and a resonant period.

The voltage applied to the creeping discharge element 17 and the resonant period have the relation illustrated in FIG. 9. While the applied voltage is increased, the streamer is generated at a certain voltage (11 kVpp in this example). Thereafter, the resonant period increases as the streamer grows more with the increase of the applied voltage. Thus, if the applied voltage is determined, the resonant period is also determined uniquely.

The capacitive component of the creeping discharge element 17 increases not only according to the voltage applied to the creeping discharge element 17 but also due to an environmental factor such as adhesion of droplets and dust. The increase in the capacitive component due to the environmental factor is desirably avoided because it is larger than a capacitance increase ascribable to the growth of the streamer and causes an increase in the resonant current and an accompanying increase of a loss.

Here, if the voltage applied to the creeping discharge element 17 is determined, the resonant period is determined, and therefore, setting a threshold value according to the applied voltage enables to detect an increase in the capacitive component due to the environmental factor.

Specifically, both when the low voltage is applied and when the high voltage is applied, the controller compares the resonant period of the resonant current with the preset threshold value. When the resonant period exceeds the threshold value, the controller stops the discharge or reset a discharge start command, thereby reducing an increase of a loss.

Since the resonant period varies according to the voltage applied to the creeping discharge element 17 as previously described, the memory 20 preferably memorizes at least two or more of the threshold values of the resonant period for the low-voltage application time without the generation of the streamer and for the high-voltage application time with the generation of the streamer.

In this embodiment, the first threshold value 20a is a threshold value referred to when the low voltage is applied and the second threshold value 20b is a threshold value referred to when the high voltage is applied.

Figure 10:
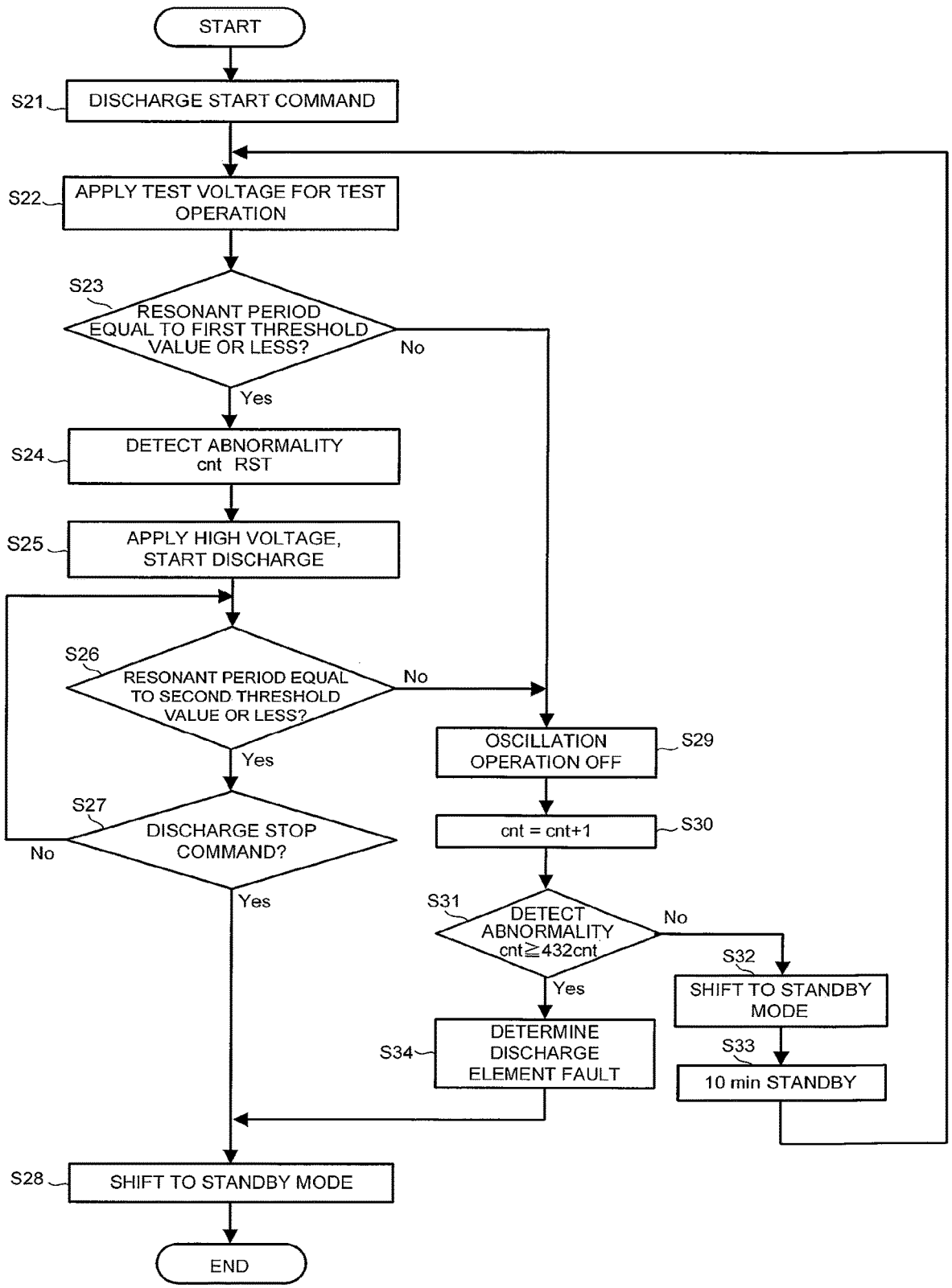
FIG. 10 is a flowchart illustrating mainly a discharge control according to a detected resonant period.
Figure 11:
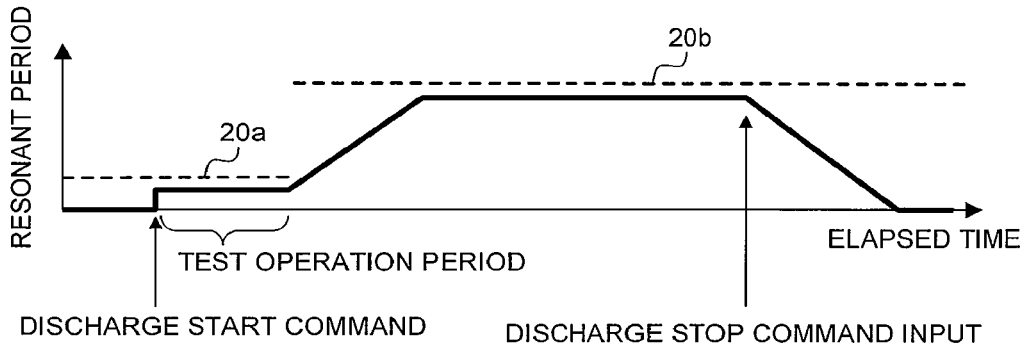
FIG. 11 is a chart illustrating how the resonant period varies when the creeping discharge element has an abnormality neither during test operation nor during regular operation and the discharge is stopped because a discharge stop command is externally input (normal operation).
Figure 12:
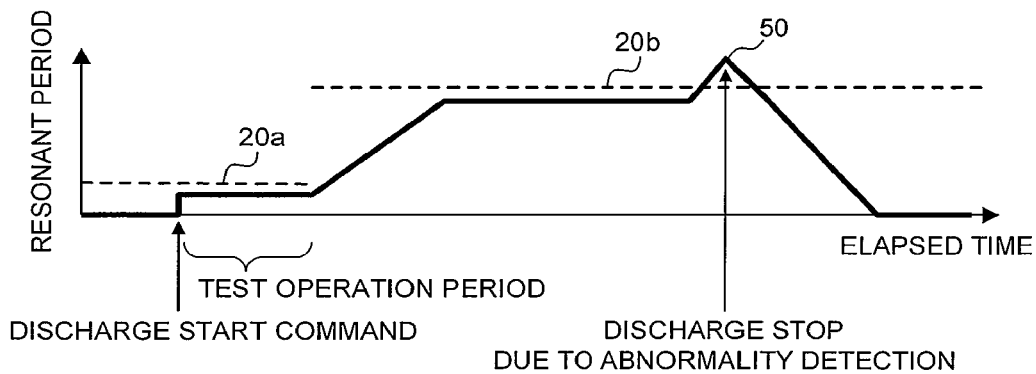
FIG. 12 is a chart illustrating how the resonant period varies when the creeping discharge element has no abnormality during the test operation and an abnormality is detected in the creeping discharge element after the discharge starts.
Figure 13:
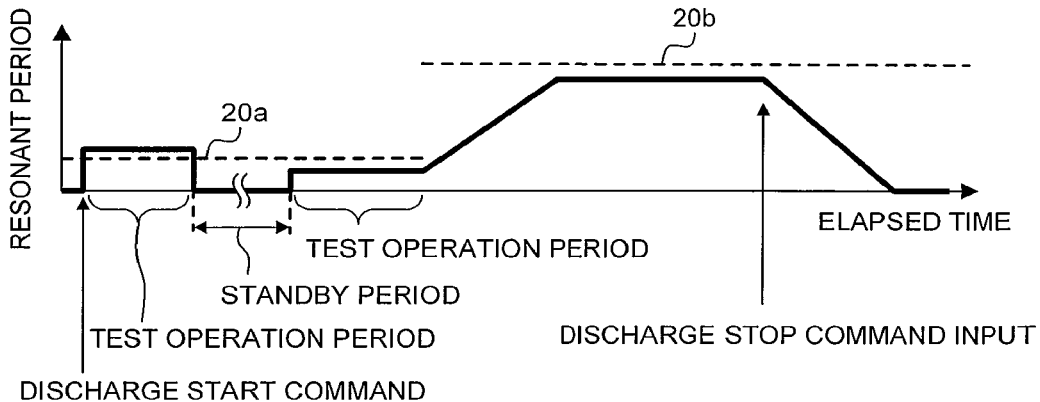
FIG. 13 is a chart illustrating how the resonant period varies when an abnormality has already occurred in the creeping discharge element during the test operation.

FIG. 10 is a flowchart illustrating the control operation by the MCU 19, and FIG. 11 to FIG. 13 are charts illustrating how the resonant period varies when the flowchart is executed.

FIG. 11 illustrates how the resonant period varies, when no abnormality is detected at the start of the test and during the regular operation and the discharge stop command is externally input to stop the operation.

FIG. 12 illustrates how the resonant period varies, when no abnormality is detected at the start of the test, and an abnormality is detected during the regular operation, to stop the discharge.

FIG. 13 illustrates how the resonant period varies, when an abnormality is detected at the start of the test, then an abnormality is not detected in additional test operation after a predetermined standby time to start the regular operation, and a discharge stop command is externally input, while continuing the regular operation, to stop the operation.

When the discharge start command is externally input (Step S21 in FIG. 10), the MCU 19 applies, to the creeping discharge element 17, a low voltage of, for example, several kV (about 2 kV) (hereinafter, referred to as a "test voltage") causing no generation of the streamer (Step S22). Then, MCU 19 detects the period of the resonant current, and compares it with the first threshold value 20a (Step S23).

Here, when the creeping discharge element 17 has no abnormality and no increase in the capacitive component ascribable to the adhesion of droplets, the period of the resonant current is equal to or less than the first threshold value 20a (Step S23: Yes), leading to determine that an electrode state is normal. In this case, the MCU 19 resets the abnormality detection counter (cnt) (Step S24) to shifts to a regular operation mode, and accordingly the high voltage for generating the streamer is applied to the creeping discharge element 17 to start the plasma discharge (Step S25). The MCU 19 operates for supplying a discharge-on voltage to the creeping discharge element 17 according to the flowchart illustrated in FIG. 7.

During the discharge, the MCU 19 constantly detects the resonant period of the resonant current, and compares it with the second threshold value 20b (Step S26). When the comparison turns out that the creeping discharge element 17 has no abnormality and no increase in the capacitive component due to the adhesion of droplets or the like, the MCU 19 continues the regular operation.

Then, when receiving the discharge stop command from a higher-order device or an external stop switch (Step S27: Yes), the MCU 19 shifts to a stop mode where the system operation is stopped (Step S28). FIG. 11 illustrates how the resonant period varies in this series of processes.

When the comparison of the resonant period of the resonant current with the second threshold value 20b at Step S26 turns out that the resonant period exceeds the second threshold value 20b (Step S26: No) (place indicated by the sign 50 in FIG. 12), the MCU 19 determines that the resonant period is abnormal to stop the oscillation operation by the switching circuit 12 (Step S29), and to increment the abnormality detection counter 19a (cnt=cnt+1) (Step S30).

On the other hand, as in FIG. 13 where the capacitive component has already increased during the test operation due to the environmental factor such as rainfall, when the resonant period detected in a resonant voltage detection period is compared with the first threshold value 20a (Step S23) after the application of the test voltage in response to the input of the discharge start command, the resonant period sometimes exceeds the first threshold value 20a.

In this case (Step S23: No), the MCU 19 determines that the resonant period is abnormal due to the environmental factor, to stop the oscillation operation by the switching circuit 12 (Step S29) and increments the internal abnormality detection counter 19a (cnt=cnt+1) (Step S30).

Then, when the count value (the number of times of the abnormality detection) of the abnormality detection counter 19a is less than the preset threshold value "432" (Step S31: No), the MCU 19 determines that the abnormality is a temporary abnormality ascribable to the environmental factor and shifts to a standby mode (Step S32) to wait for a predetermined period (for example, ten minutes) (Step S33).

After the aforesaid predetermined time (ten minutes) passes, the MCU 19 shifts to Step S22 to apply the test voltage again. When the resonant period is still exceeds the first threshold value 20a at Step S23, the MCU 19 executes the processes at Steps S29 to S33 again.

When this operation is continued a predetermined number of times (for example, 432 counts, corresponding to three days (predetermined period)) or more (Step S31: Yes), the MCU 19 determines that the abnormality is not ascribable to the environmental factor but is a discharge element fault (abnormality) (Step S34) and shifts to a system stop mode (Step S28) to stop the system operation itself.

The resonant period used in the above-described control may be the resonant period detected by one of the current detectors 18a, 18b or an average value of the resonant periods detected by the current detectors 18a, 18b at a predetermined time.

As described above, according to the first embodiment, when the test voltage is applied in the initial operation, the following processes proceed: detecting the zero-cross points of the resonant currents flowing through the current detecting elements 18a, 18b disposed between the emitters of the negative-side switching elements 12d, 12c and the negative-side power supply line; determining the resonant periods based on the zero-cross points; and stopping the power supply when either of the resonant periods exceeds the preset first threshold value 20a. This enables to avoid, in advance, the circuit from getting overloaded due to the increase in the capacitive component of the creeping discharge element 17 ascribable to the environmental factor such as the adhesion of droplets on the creeping discharge element 17.

When the resonant period thereafter decreases to the first threshold value 20a or less, the MCU 19 determines that the creeping discharge element 17 has got rid of the influence of the environmental factor, and resumes the temporarily stopped power supply to the creeping discharge element 17. This prevents the creeping discharge element 17 from being left stopped, leading to improved operation efficiency.

Further, when the capacitive component keeps increasing for the predetermined period, the MCU 19 determines that the creeping discharge element 17 itself has an abnormality and stops the operation of the system itself, instead of the standby for the power supply to the creeping discharge element 17. This enables to repair or change the creeping discharge element 17.

In addition, the MCU 19 detects an abnormal state of the capacitive component by applying the test voltage before the start of the discharge, and stops the oscillation operation of the switching circuit 12. This can prevent an excessive current from flowing through the creeping discharge element 17 due to an increase in the capacitive component.

Second Embodiment

FIG. 14 to FIG. 17 illustrate a second embodiment. The same constituent elements as those in the first embodiment are denoted by the same reference signs and descriptions thereof will be skipped, and different parts will be described.

Figure 14:
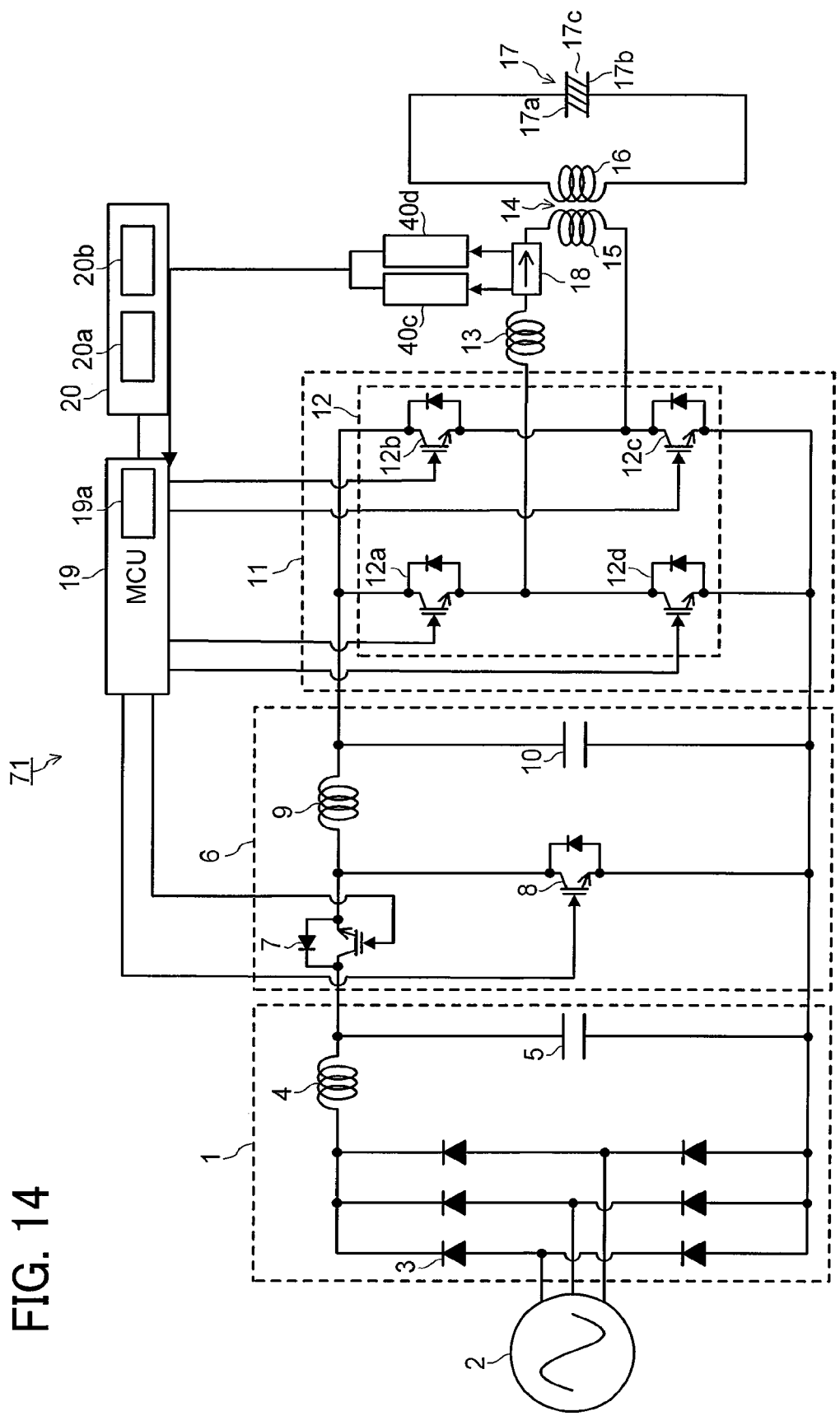
FIG. 14 is a diagram illustrating the electrical configuration (circuit configuration) of a creeping discharge element drive system of a second embodiment.

As illustrated in FIG. 14, a creeping discharge element drive system 71 of the second embodiment has a circuit configuration in which one current detecting element 18 is disposed between one end of a resonant reactor 13 and a primary winding 15 of a high-frequency high-voltage transformer 14, and two zero-cross point detection circuits 40c, 40d connect to the current detecting element 18.

Next, the configuration and operation of the second embodiment will be described with reference to FIG. 2 and FIG. 14 to FIG. 17. Note that details of the control by the MCU 19 are the same as those illustrated in FIG. 7.

In the second embodiment, the switching operations of switching elements 12c, 12d are controlled based on zero-cross points of resonant currents flowing in a series resonant circuit 11 as in the example in the timing chart of the first embodiment illustrated in FIG. 2. However, in the second embodiment, the single current detecting element 18 detects a first resonant current while the switching elements 12a, 12c are on, and a second resonant current while the switching elements 12b, 12d are on, thus forming a first and a second zero-cross points corresponding to the first and second resonant currents. Therefore, these zero-cross points are detected by different circuits.

Figure 15:
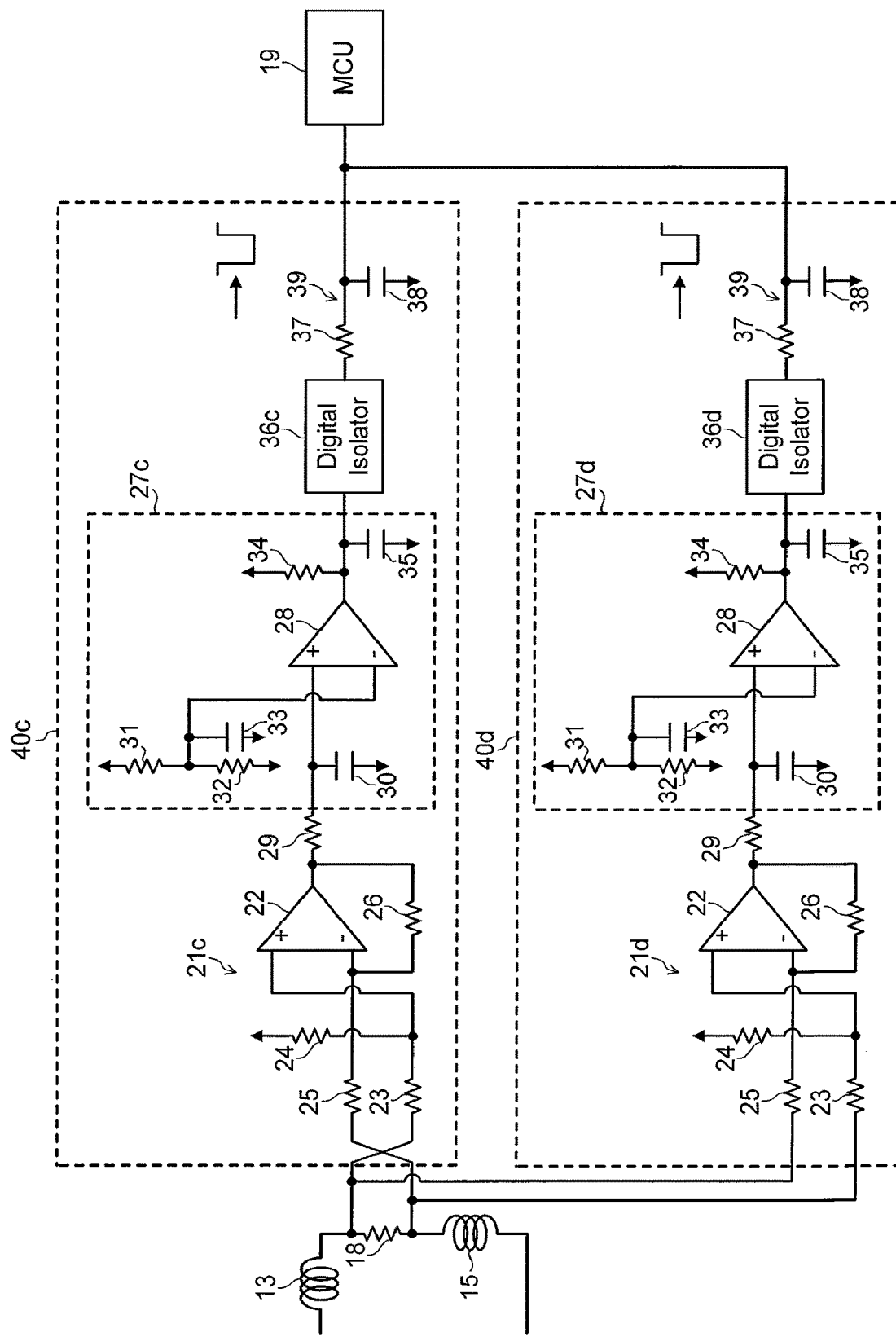
FIG. 15 is a diagram illustrating the electrical configuration (circuit configuration) of zero-cross point detection circuits of the second embodiment.

FIG. 15 is a diagram illustrating the internal configuration of the two zero-cross point detection circuits 40c, 40d corresponding to directions of a current which flows through the current detecting element 18 when the switching by the switching elements 12c, 12d is driven.

As illustrated in FIG. 15, the zero-cross point detection circuits 40c, 40d basically have the same circuit configuration as that of the zero-cross point detection circuit 40a of the first embodiment. In the second embodiment, the connection of the current detecting element 18 and a differential amplifier circuit 21c in the zero-cross point detection circuit 40c is the same as in the first embodiment, but the connection of the current detecting element 18 and a differential amplifier circuit 21d in the zero-cross point detection circuit 40d are different from in the first embodiment, that is, an inverting input terminal and a noninverting input terminal are reversed.

The interchanging input signals of the amplifier circuits 21c, 21d enables to generate off-interrupt signals having the same waveform (falling edge), at zero-cross points of the resonant currents flowing through the switching elements 12c, 12d respectively.

Figure 16:
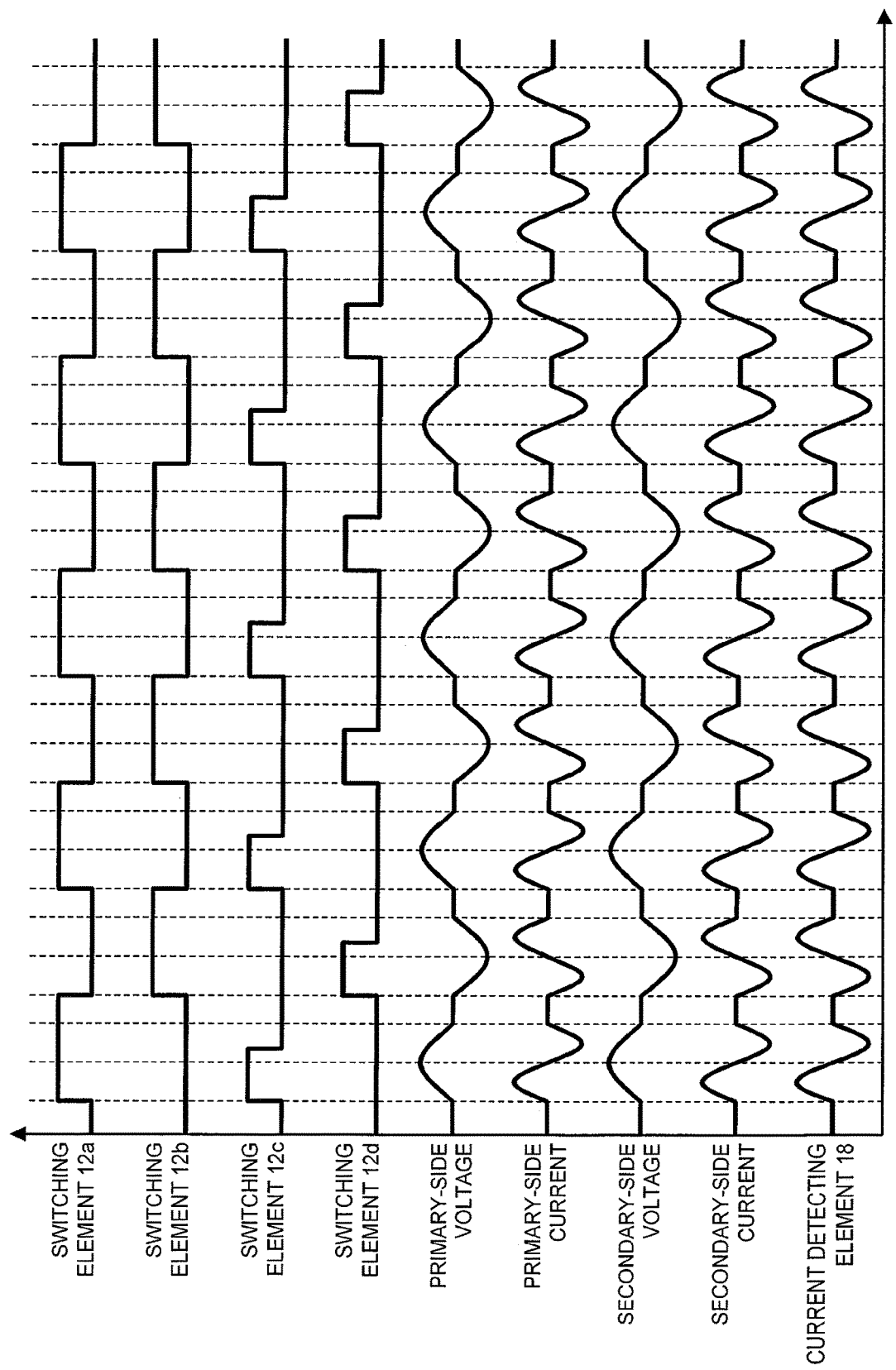
FIG. 16 is a timing chart illustrating a waveform of a current flowing through a current detecting element in the second embodiment.
Figure 17:
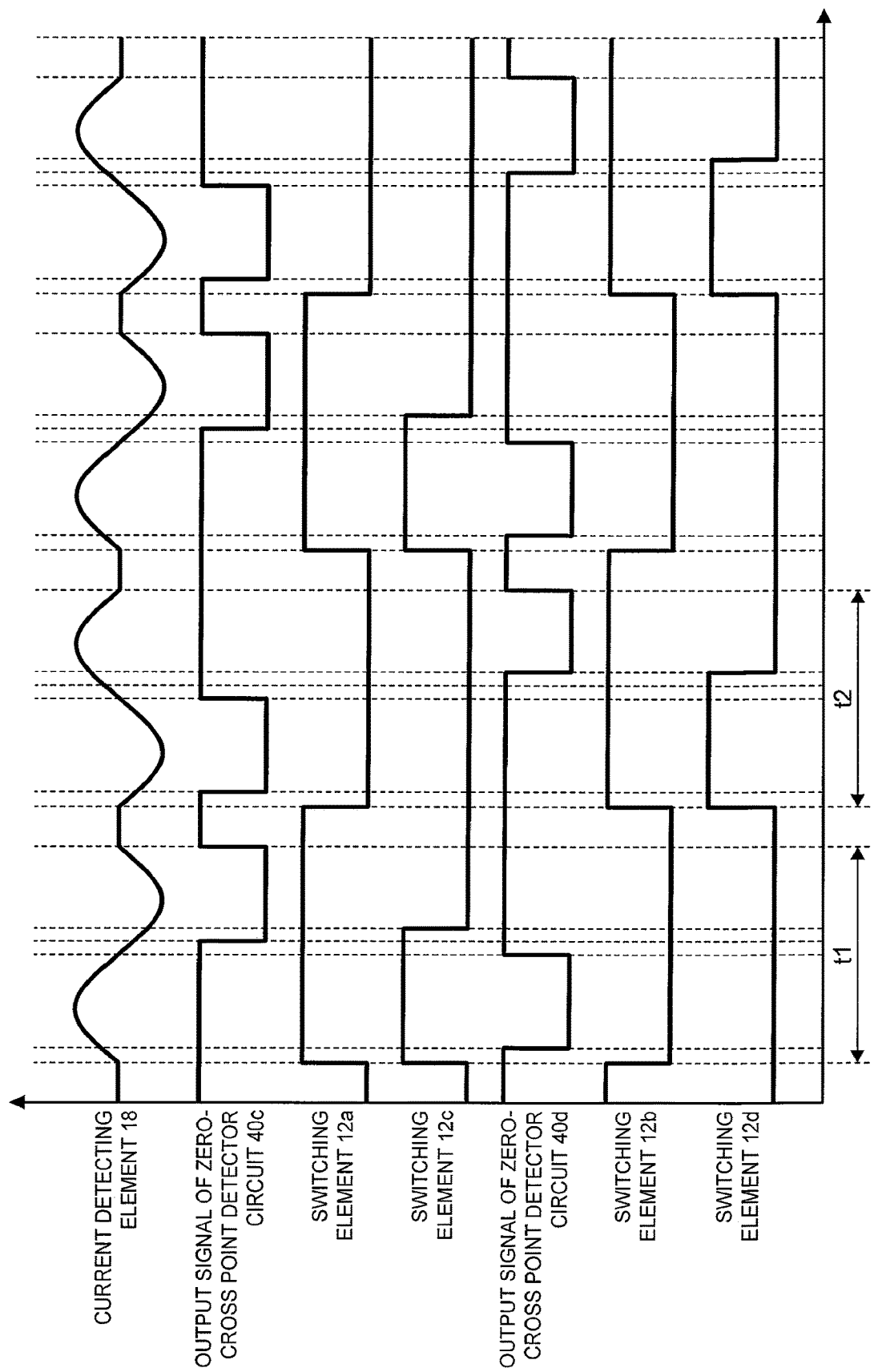
FIG. 17 is a timing chart illustrating output signals of the zero-cross point detection circuits when the current in FIG. 16 is input.

FIG. 16 is a timing chart of signals in the second embodiment, and FIG. 17 is a timing chart of signals output from the zero-cross point detection circuits 40c, 40d.

In the second embodiment, the current detecting element 18 carries a current having a period of zero-volt and the next period of a plus-minus-inverted waveform in every period, as illustrated in FIG. 16.

The current thus flowing through the current detecting element 18 is input to the zero-cross point detection circuit 40c. As illustrated in FIG. 17, the output signal of the zero-cross point detection circuit 40c changes from high level to low level when a negative current flows through the current detecting element 18, and it returns to high level from low level when a current value reaches zero.

On the other hand, the output signal of the zero-cross point detection circuit 40d changes from high level to low level when a positive current flows through the current detecting element 18, and it returns to high level from low level when a current value reaches zero.

An off-interrupt based on the output signal of the zero-cross point detection circuit 40c takes place after a delay corresponding to a deadtime also at the time of an off-interrupt due to the zero-cross detection on the switching element 12d side.

However, at this time, since the switching element 12a and the switching element 12c are both off, the occurrence of the off-interrupt based on the zero-cross point detection circuit 40c causes no issue to be deal with. The same applies to the zero-cross point detection circuit 40d.

Here, during a discharge period of the creeping discharge element 17, the capacitance may be varied due to different polarities of voltages applied to the creeping discharge element 17.

To cope with this, as illustrated in FIG. 17, a timer is operated during periods from on-timings of the switching elements 12a to 12d up to rising edges of the output signals of the zero-cross point detection circuits 40c, 40d (off-interrupt signals of the switching elements 12c, 12d), and times t1, t2 are detected as the resonant periods.

Specifically, MCU 19 detects a rising edge of the switching element 12a to start the internal timer, and thereafter detects the rising edge of the output signal of the zero-cross detection circuit 40c to stop the timer, and defines this period from the start to the stop as the resonant period.

Note that a falling edge of the output signal of the zero-cross point detection circuit signal 40c is used to generate an off signal of the switching element 12c. The resonant period used for the high-efficiency control is desirably a longer one out of the times t1, t2. This example uses the time t1 as the resonant period, for instance.

As described above, according to the second embodiment, the single current detecting element 18 connects to the primary winding of the high-frequency high-voltage transformer 14, the two zero-cross point detection circuits 40c, 40d connect to the current detecting element 18, and two zero-cross points are detected corresponding to two resonant currents flowing through the switching elements 12a to 12d. With this circuit configuration, the following process proceeds: determining the resonant period from the zero-cross point detected from the resonant current flowing through the current detecting element 18; comparing the resonant period with two threshold values (the first threshold value 20a and the second threshold value 20b); and controlling the switching circuit 12 based on the comparison determination. This enables to avoid the circuit from getting overloaded even if a load capacitance increases due to an external environmental change such as rainfall. Further, as in the first embodiment, the high-efficiency control of the switching circuit 12 is possible.

Other Embodiments

In the control flowchart illustrated in FIG. 10, the standby time at Step S33 is ten minutes, but the standby time is not limited to ten minutes and may be appropriately changed according to an installation environment or the like of the system. Further, regarding the threshold value "432" of the count number at Step S31, "432" is a count value corresponding to three days, but the count number threshold value is not limited to this and may be appropriately changed.

The connection position of the current detecting element 18 is not limited to the positions in the first embodiment and the second embodiment, and can be modified variously.

Figure 18:
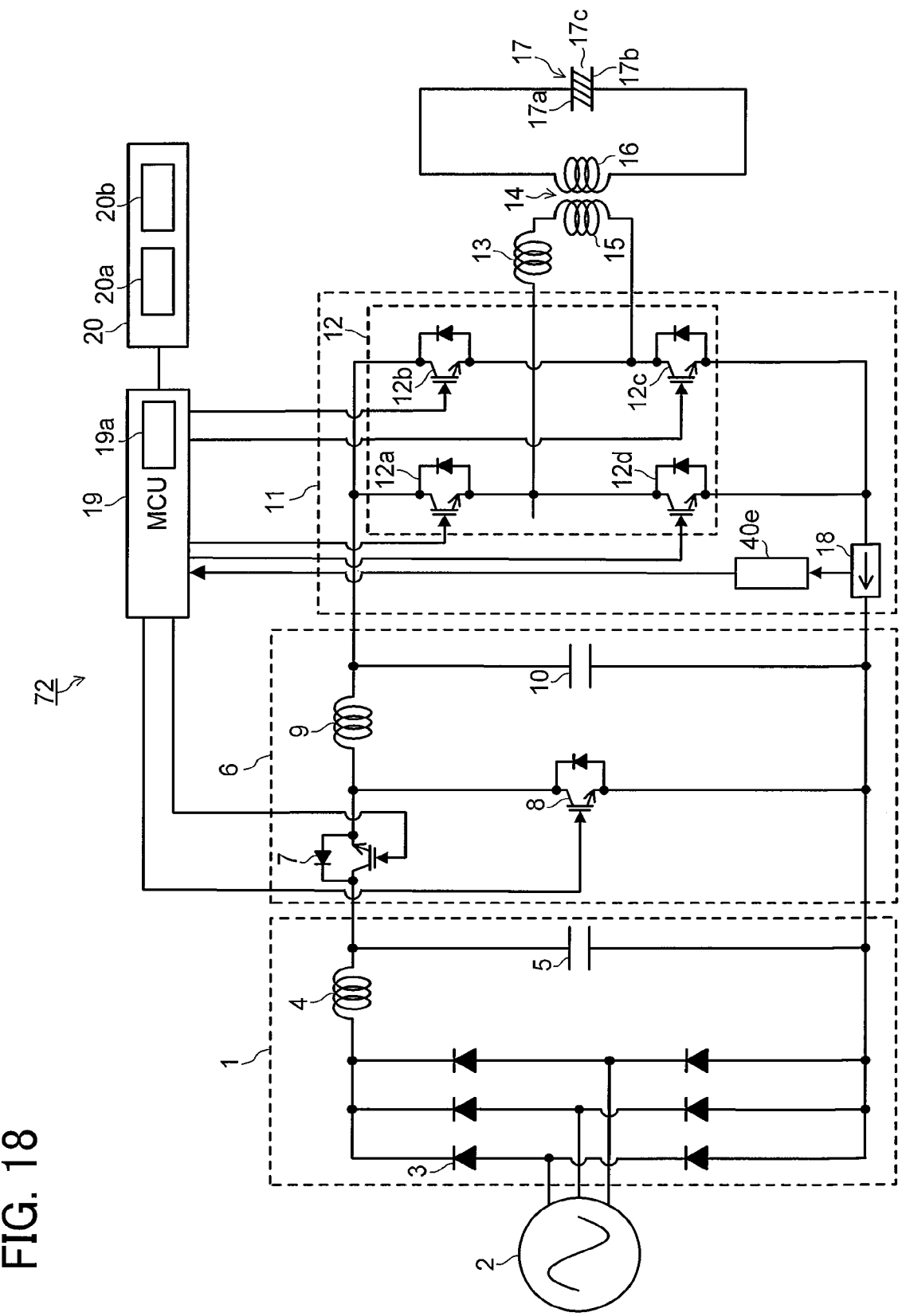
FIG. 18 is a diagram illustrating the electrical configuration (circuit configuration) of another embodiment.

For example, as illustrated in, FIG. 18, the current detecting element 18 may connect between emitters (a common node) of the switching elements 12c, 12d and a negative terminal of a smoothing capacitor 10, and a zero-cross point detection circuit 40e may connect to the current detecting element 18.

Figure 19:
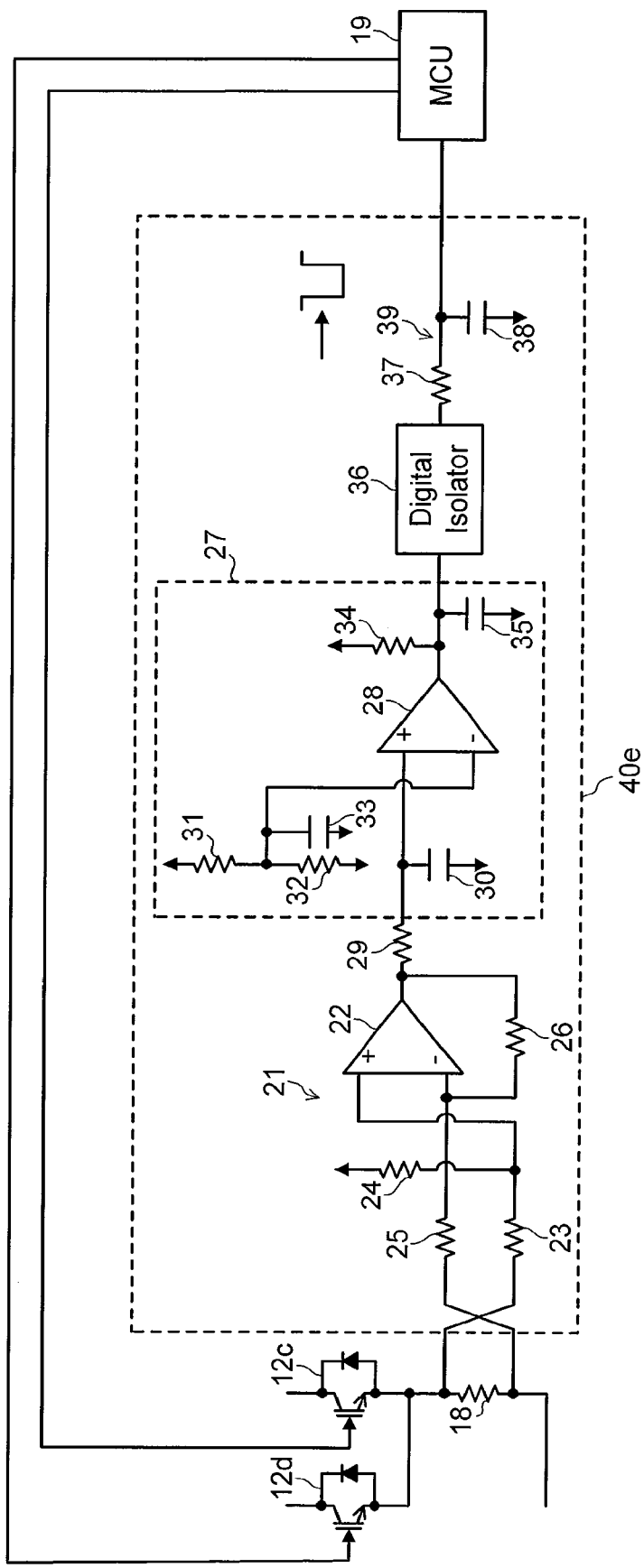
FIG. 19 is a diagram illustrating the electrical configuration (circuit configuration) of a zero-cross point detection circuit in the other embodiment.

The circuit configuration of the zero-cross point detection circuit 40e in this case is the same as the circuit configuration of the zero-cross point detection circuit 40a (refer to FIG. 5) as illustrated in FIG. 19, and therefore, a description of the circuit will be skipped.

Figure 20:
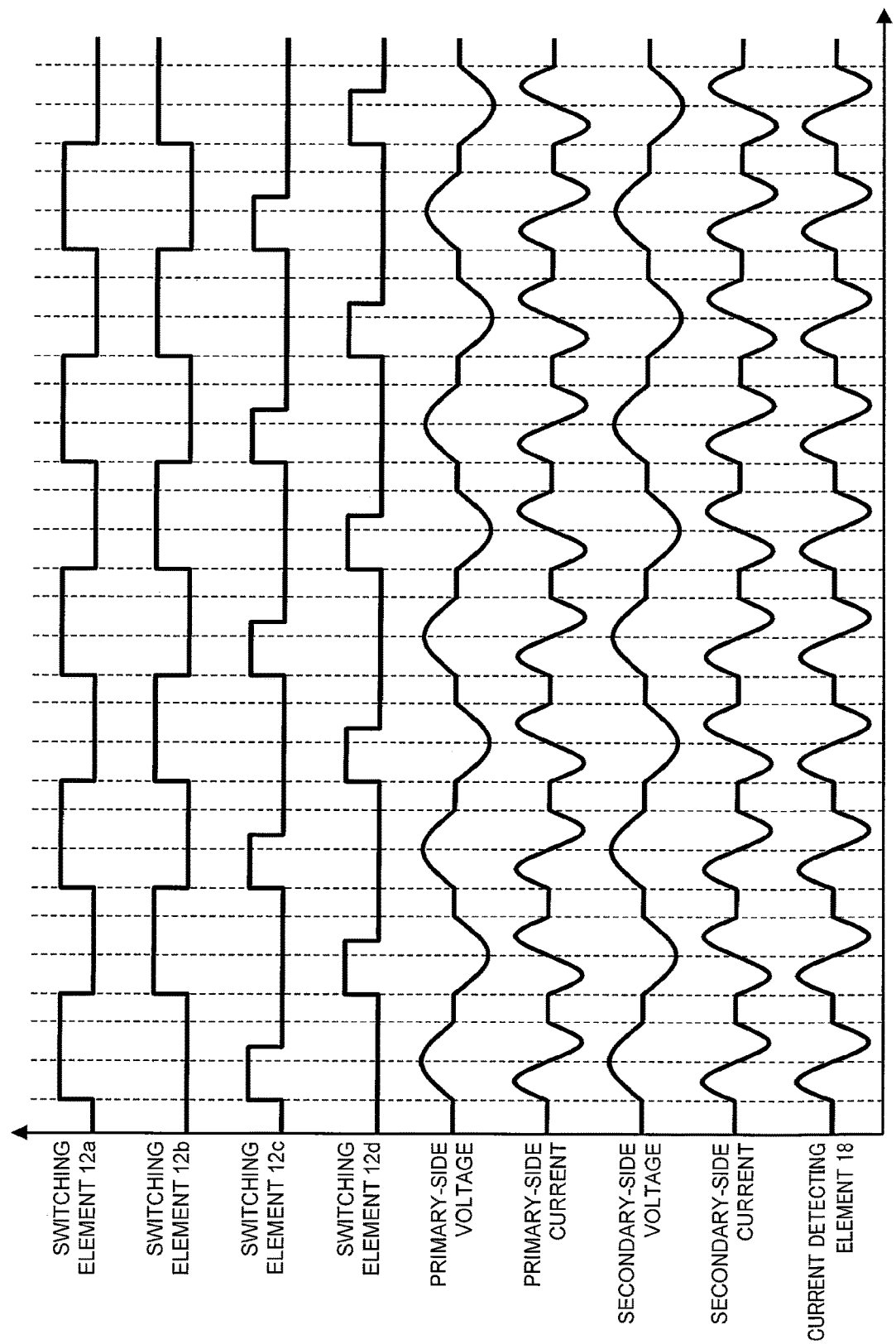
FIG. 20 is a timing chart illustrating a waveform of a current flowing in a current detecting element in the other embodiment.

In this case, a signal detected by the current detecting element 18 has a waveform in which a zero-volt period occurs every period, as illustrated in FIG. 20. So, the single zero-cross point detection circuit 40e and the MCU 19 can be used to generate signals for driving the switching elements 12c, 12d. Further, a control operation is the same as that in the first embodiment.

According to at least one of the embodiments described hitherto, even if the load capacitance increases due to the deterioration of the creeping discharge element 17 or an external environmental change, the circuit is avoided from getting overloaded without installing any external environment detector (for example, a rainfall detector).

In the above-described embodiments, the voltage lower than the voltage applied during the regular operation is applied during the test operation (test energization), but the procedure from the test operation up to the regular operation may be considered as a series of flow. In this case, this procedure is the startup rather than the test operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Further, the functional elements of the MCU 19 and the constituent elements of the circuits presented in the above-described embodiments may be implemented by a program installed in a storage such as a hard disk drive of a general-purpose computer. Further, the program may be stored in a computer-readable electronic media, and the functions of the present invention may be implemented by a computer reading the program from the electronic media. Examples of the electronic media include a storage media such as CD-ROM, a flash memory, and a removable media. Further, the constituent elements may be stored in a distributed manner in different computers which are connected through a network, and the present invention may be implemented through the communication among the computers functioning as the respective constituent elements.

What is claimed is:

1. A creeping discharge element drive device comprising:
a switching element configured to connect to a creeping discharge element;
a current detector configured to detect an alternating current flowing through the switching element;
a zero-cross detection circuit configured to detect a zero-cross point of the alternating current detected by the current detector;
a storage configured to store a first threshold value of a resonant period for determining an abnormality of the creeping discharge element during test operation; and
a controller programmed to:
drive the switching element to apply a test voltage to the creeping discharge element during the test operation, the test voltage being lower than a voltage applied to the creeping discharge element at a start of regular operation;
determine a resonant period of the alternating current from a zero-cross point of the alternating current detected by the zero-cross detection circuit during the test operation; and
restrict or stop the driving of the switching element in response to the resonant period exceeding the first threshold value.

2. The creeping discharge element drive device according to claim 1,
wherein the controller is programmed to:
determine a second resonant period of the alternating current from a second zero-cross point of the alternating current while restricting or stopping the driving of the switching element; and
drive the switching element to apply a voltage for the regular operation to the creeping discharge element in response to the second resonant period being equal to or less than the first threshold value.

3. The creeping discharge element drive device according to claim 1,
wherein the storage stores a second threshold value of the resonant period for determining an abnormality of the creeping discharge element during discharge, and
wherein the controller is programmed to:
determine a third resonant period of the alternating current from a second zero-cross point of the alternating current during the discharge; and
restrict or stop the driving of the switching element in response to the third resonant period exceeding the second threshold value.

4. The creeping discharge element drive device according to claim 1,
wherein the controller is programmed to:
count the number of times the resonant period exceeds the first threshold value;

stop the driving of the switching element in response to the number being less than a predetermined number; and resume the test operation after a predetermined standby period from the stopping.

5. A creeping discharge element drive method for driving a creeping discharge element drive device including a switching element connected to a creeping discharge element, the method comprising:

storing a first threshold value of a resonant period for determining an abnormality of the creeping discharge element during test operation;

detecting an alternating current flowing through the switching element;

detecting a zero-cross point of the detected alternating current;

driving the switching element to apply a voltage to the creeping discharge element during the test operation, the voltage being lower than a voltage applied to the element at a start of regular operation;

determining a resonant period of the alternating current from the detected zero-cross point of the alternating current during the test operation; and restricting or stopping the driving of the switching element in response to the resonant period exceeding the first threshold value.

* * * * *